Jan. 22, 1952  J. MERCIER  2,583,384
FLOW REGULATOR
Filed Sept. 29, 1944
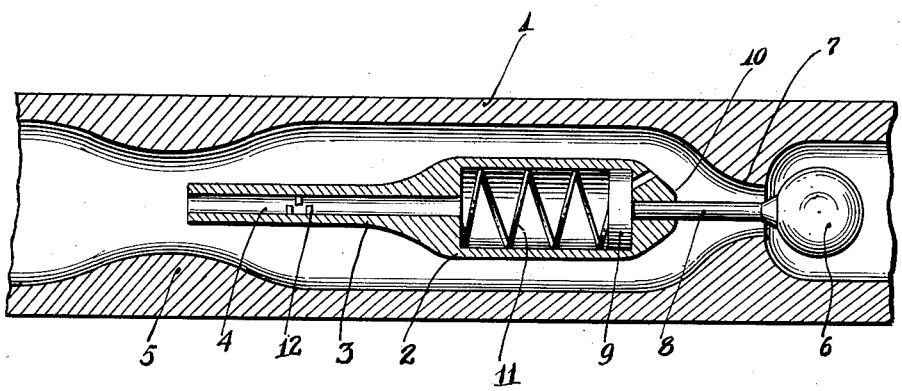
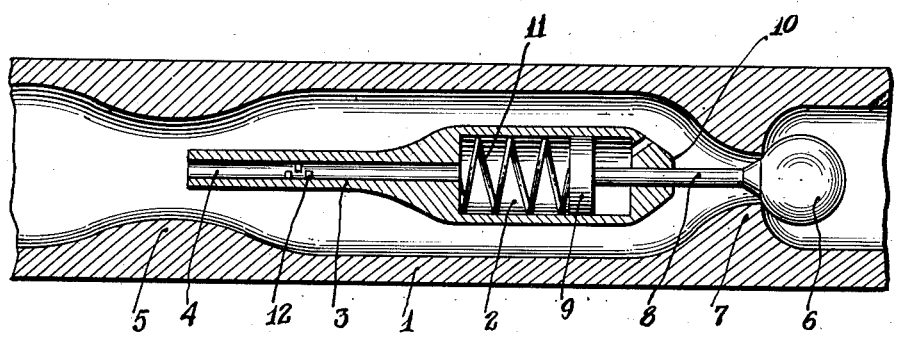
INVENTOR.
Jean Mercier
BY
Howard T. Jeandron
ATTORNEY Patented Jan. 22, 1952

2,583,384

UNITED STATES PATENT OFFICE 2,583,384

FLOW REGULATOR

Jean Mercier, New York, N. Y.

Application September 29, 1944, Serial No. 556,459

2 Claims. (Cl. 137—153)

This application is a continuation in part of the previously filed application, Serial No. 486,673, filed May 12, 1943. This application has become abandoned.

This invention relates to automatic cut-off devices, and more particularly to a control device for checking the flow of a fluid in a conduit whenever the flow exceeds a predetermined rate.

It has been a practice to install in the hydraulic systems of aircraft and other vehicles employing an hydraulic system, a valve means in a conduit with a movable valve element. This valve element is located upstream with respect to a valve seat and held there by a resilient means. The device will be actuated by an increase in differential pressure resulting from an increase rate of fluid flow which overcomes resilient means holding the valve open and forces the valve element to close on its seat. A device of this type is essential in hydraulic or pneumatic systems, on aircraft or other vehicles because of the limited supply of fluid. In a device such as this, the valve device must be very sensitive so that only a little difference in pressure on either side of the valve is required to make it function. If the device were less sensitive, that is, required a large difference in pressure between the upstream and downstream portions of the valve to cause its movement, a considerable loss of fluid would occur before the valve could close.

An object of the present invention is to provide a valve structure for an automatic cut-off device that is very sensitive and does not allow an appreciable loss of fluid from the system before the cut-off valve operates.

Another object of the present invention is to provide a valve structure for an automatic cut-off device that will close the conduit whenever the pressure in said automatic cut-off device drops below a predetermined value.

A still further object of the present invention is to provide a valve structure with means to restrict the flow of fluid in an automatic cut-off device and to close said valve when an excessive flow of fluid occurs.

Another object of the present invention is to provide a valve structure for an automatic cut-off device in which there is provided means that is proportionally related to the flow of fluid through said valve to close same.

Other objects and characteristic features of the invention will appear from the following detailed description of one embodiment thereof, taken in connection with the accompanying drawings wherein identical references are applied to identical parts in all the figures and in which Fig. 1 is a diagrammatic section of a flow cut-off valve shown in an open position, and Fig. 2 illustrates the same flow cut-off valve in a closed position.

Mounted within a chamber 14 in a conduit 1 is a cylindrical member 2 having a chamber 2a which communicates with the downstream side of the conduit chamber 14 through an open port 4 of a projecting portion 3 and with the upstream side of the conduit through an opening 13. The cross-sectional area of conduit 1 is reduced over the portion adjacent port 4 to form a throat portion 5.

Mounted in the opposite end of the member 2 is a piston 9, with a rod 8, projecting toward the upstream portion of a chamber 14. A ball 6 is mounted on the opposite end of the rod 8. The ball 6 is positioned on the upstream side and adjacent to a suitable valve seat 7, and on the opposite side of said seat 7 the cylindrical member 2 is positioned. In the illustrated embodiment, the position of ball 6 is directly controlled by virtue of a piston rod 8 rigid with a piston 9 which slidably engages the interior wall of chamber 2a and is held in position by spring 11. Rod 8 enters chamber 2a on the upstream side through an opening 10 and said rod is provided with suitable sealing means to prevent inflow of fluid through the opening 10.

The spring 11 acts upon the downstream side of the piston 9 thereby keeping the ball 6 raised from the seat 7 when the pressures are balanced. When a decrease of pressure occurs on the down stream side of the piston in the chamber 2a in the member 2, relative to the upstream pressure on the piston due to an increase rate of flow in chamber 14 in the conduit 1, the decrease on the downstream side relative to the pressure on the upstream side will force the piston toward the downstream end of the chamber 2a contracting spring 11, whereupon ball 6 is forced against seat 7 to close the aperture.

The small opening 13 is provided in the upstream portion of chamber 2a which has two functions, one to prevent a vacuum forming in the upstream side of the chamber when the piston moves toward the downstream position to close said valve, two, to permit a given percentage of the fluid flowing through chamber 14 to flow in through this orifice and exert a force against the piston 9 on the upstream side.

A toroidal seal 15 may be provided around the rod 8 in the opening 10 to prevent flow of fluid or leakage through this opening depending upon the irregularities of the rod, however, when there is a perfect fit with little or no irregularity in its surface the seal may be dispensed with. The orifice 13 is carefully chosen to permit a measured flow of fluid in relation to the amount flowing through chamber 14. With the orifice so chosen, the volume of fluid flow regardless of pressure or viscosity through the orifice is in proportion to the volume flow through conduit 14. Thus it is that the piston 9 will be forced against the resilient means 11 to close the valve 6 when a greater flow than normal or larger volume of fluid flows through chamber 14.

One example of operation is when the system or flow meter is designed to pass one half gallon of fluid, in this case the orifice must be designed to pass one cubic inch in the same set interval of time as the one-half gallon, and the operation is substantially independent of the velocity of fluid. The piston size and stroke is predetermined to receive one cubic inch which is approximately 100th of one half gallon. This one cubic inch of fluid must be sufficient to close the valve regardless of the velocity of the flow.

It is also true that when the throat 5 is enlarged or eliminated, the flow through the orifice 13 is proportional to the flow through chamber 14, thus when a given volume has flowed through chamber 14 a given volume has entered chamber 2a, the valve should close regardless of changes in pressure and viscosity, providing the friction and force of the spring remain negligible as the purpose of the spring is to position the valve in an open position when there is no flow.

When the volume of the chamber generated by the displacement of the piston 9 is doubled, the valve 6 will be closed after twice the volume of the previous quantity has flowed through the orifice 13, while double the volume has flowed through the system. Likewise, if in the original case the size of the orifice 13 is doubled, then one half of the original volume or flow will be required to close the valve 6.

In the present invention when the hydraulic system is at rest the pressure inside the chamber 2a of said valve on the opposite side of the piston 9 with relation to orifice 13, and outside said chamber, but within the conduit 1, will be the same. Whenever fluid flows through said conduit 1, a decrease of pressure in chamber 2a on the side of said piston toward port 4 will be observed in the chamber 2a of said valve. The function between rate of flow in the conduit 1 and rate of decrease of pressure in said chamber 2a on the opposite side of said piston with relation to orifice 13 will vary, depending upon the dimensions of the opening 4 of said chamber 2a in said conduit 1 and the cross-sectional area (or throat) 5 of the adjacent portion of the conduit. By a suitable choice of these dimensions, i. e. by making the opening 4 of the chamber 2a and the cross-sectional area of the adjacent portion of the conduit small, it is possible to achieve a rate of decrease of pressure in the chamber 2a under said piston, which is a potential multiple of the rate of flow variation.

Also in the present invention, there is provided an orifice 13 toward the upstream position between the conduit and the valve control chamber 2a on the side above the piston, the orifice 13 is so placed that the flow of fluid at a given pressure through the conduit 1 will also flow through said orifice 13 at the same pressure. The size of said orifice 13 is directly proportional to the clearance between the valve control chamber 2a and the inside wall of the conduit 1; if the orifice 13 were equal to the outer conduit clearance the fluid under pressure in said conduit would pass into said orifice in the same quantity as it passes through said conduit, thus the quantity could be determined. Therefore with a smaller predetermined orifice 13, a given quantity of flow at a given pressure may also be determined.

The foregoing description is not intended to limit the present invention which extends to all changes, modifications and equivalents within the scope of the appended claims.

What is claimed is:

1. An excess flow cut-off device comprising a conduit member provided with a valve seat, a valve element coacting with said seat to shut off flow through said conduit member, means biasing said valve element to open position, a chamber positioned in said conduit member downstream of said valve seat, an imperforate movable partition in said chamber connected to the valve element and separating the upstream end from the downstream end, a small orifice establishing communication between the upstream end of the chamber and the portion of conduit member located between the chamber and said seat, a restriction formed in said conduit member downstream of said chamber arranged to produce a zone of high velocity flow and low pressure, means establishing communication between said zone and the downstream end of the chamber, whereby when the velocity of flow through said restriction exceeds a predetermined value as determined by the biasing means a differential pressure will be created on opposite faces of the partition sufficient to effect movement of the partition and valve element connected thereto to closed position.

2. An excess flow cut-off device comprising a conduit member provided with a valve seat, a valve element coacting with said seat to shut off flow through said conduit member, means biasing said valve element to open position, a chamber positioned in said conduit member downstream of said valve seat, said chamber concentric with said conduit, an imperforate movable partition in said chamber connected to the valve element and separating the upstream end from the downstream end, a small orifice establishing communication between the upstream end of the chamber and the portion of conduit member located between the chamber and said seat, a restriction formed in said conduit member downstream of said chamber arranged to produce a zone of high velocity flow and low pressure, means establishing communication between said zone and the downstream end of the chamber, whereby when the velocity of flow through said restriction exceeds a predetermined value as determined by the biasing means a differential pressure will be created on opposite faces of the partition sufficient to effect movement of the partition and valve element connected thereto to closed position.

JEAN MERCIER.

REFERENCES CITED

The following references are of record in the file of this patent:

UNITED STATES PATENTS

| Number | Name | Date |
| --- | --- | --- |
| 1,153,850 | Meier | Sept. 14, 1915 |
| 2,204,757 | Henze | June 18, 1940 |
| 2,307,949 | Philips | Jan. 12, 1943 |
| 2,354,161 | Waterman | July 8, 1944 |

FOREIGN PATENTS

| Number | Country | Date |
| --- | --- | --- |
| 72,671 | Austria | of 1916 |
| 268,228 | Germany | of 1913 |